United States Patent
Hugot et al.

(10) Patent No.: US 8,335,537 B2
(45) Date of Patent: Dec. 18, 2012

(54) METHOD OF MANAGING AN APPLICATION EMBEDDED IN A TELECOM DEVICE

(75) Inventors: Didier Hugot, Le Plessis Robinson (FR); Christophe Foesser, La Ciotat (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 13/201,330

(22) PCT Filed: Feb. 8, 2010

(86) PCT No.: PCT/EP2010/051496
§ 371 (c)(1),
(2), (4) Date: Aug. 12, 2011

(87) PCT Pub. No.: WO2010/092018
PCT Pub. Date: Aug. 19, 2010

(65) Prior Publication Data
US 2011/0294475 A1    Dec. 1, 2011

(30) Foreign Application Priority Data
Feb. 16, 2009   (EP) .................................... 09305149

(51) Int. Cl.
*H04M 1/00*   (2006.01)

(52) U.S. Cl. .................................... 455/556.1; 455/90.1

(58) Field of Classification Search ............... 455/556.1, 455/558, 186.1, 408, 419; 235/380
See application file for complete search history.

(56) References Cited

U.S. PATENT DOCUMENTS

| 2007/0220498 | A1  | 9/2007 | Madsen |
| 2008/0144796 | A1  | 6/2008 | Ringland et al. |
| 2010/0210304 | A1* | 8/2010 | Huslak .......................... 455/558 |

FOREIGN PATENT DOCUMENTS

| EP | 1703713 A1 | 9/2006 |
| WO | WO 2007/105051 A2 | 9/2007 |

OTHER PUBLICATIONS

International Preliminary Report on Patentability (PCT/IB/373) and the Written Opinion of the International Searching Authority (Form PCT/ISA/237) issued on Aug. 16, 2011, in the corresponding International Application No. PCT/EP2010/051496.
International Search Report (PCT/ISA/210) issued on Apr. 1, 2010, by European Patent Office as the International Searching Authority for International Application No. PCT/EP2010/051496.
Written Opinion (PCT/ISA/237) issued on Apr. 1, 2010, by European Patent Office as the International Searching Authority for International Application No. PCT/EP2010/051496.
Ortiz E., The MIDP 2.0 Push Registry, Jan. 2003 URL: http://developers.sun.com/techtopics/mobility/midp/articles/pushreg/> [retrieved on Jan. 19, 2006].

* cited by examiner

*Primary Examiner* — Tu X Nguyen
(74) *Attorney, Agent, or Firm* — Buchanan Ingersoll & Rooney PC

(57) ABSTRACT

The invention is a method of managing an application embedded in a telecom device. The telecom device comprises a SIM card and a Push Registry as defined by the Mobile Information Device Profile® specifications. The application is intended to be registered in the Push Registry by defining a specific inbound connection associated to the application. The SIM card requires a local connection on the specific inbound connection for activating the application and for establishing a local communication channel between the SIM card and the application.

15 Claims, 3 Drawing Sheets

Sent by electronic token:

| Command Number | Command Id | Command length | Command data |
|---|---|---|---|

Sent by midlet:

| Command Number | Command Id | Response length | Response data |
|---|---|---|---|

FIG.4

Get version command sent by electronic token SC:

| 0x01 | 0x01 | 0x00 | Empty |
|---|---|---|---|

Response sent by midlet:

| 0x01 | 0x01 | 0x03 | "1" "." "4" |
|---|---|---|---|

FIG.5

METHOD OF MANAGING AN APPLICATION EMBEDDED IN A TELECOM DEVICE

FIELD OF THE INVENTION

The present invention relates to methods of managing applications embedded in telecom devices. It relates particularly to methods of managing applications stored in the memory of mobile phone.

PRIOR ART

Telecom devices are machines comprising a memory, a microprocessor, an operating system and an interface allowing wireless communications according to a Telecom channel. Telecom devices usually collaborate with an electronic token that provides data related to a subscriber identity. For example, a Telecom device may be a telecom handset and the electronic token may be a SIM smart card.

Electronic tokens are small machines comprising a memory, a microprocessor and an operating system for computing treatments. In general, electronic tokens comprise a plurality of memories of different types. For example, they may comprise memory of RAM, ROM, EEPROM or Flash type. Electronic tokens have limited computing resources. For example, smart cards are electronic tokens.

A telecom handset may comprise applications which are downloaded into the handset according to user's wish or mobile network operator needs. The handset applications may be developed in Java® language. Such an application is named midlet. The midlet may comply with the Mobile Information Device Profile (MIDP)® 2.0 standards. A MIDP platform must comprise a Push Registry and an application manager. The Push Registry maintains a list of registered inbound connections. Each inbound connection is associated to a midlet. The application manager is called the application management software (AMS). The application management software assumes the responsibility of listening to inbound connections and starting the registered Midlet when data is received for the corresponding inbound connection. The Push Registry mechanism has been designed for allowing a midlet activation by preset events which may be trigged by a SMS receipt, a specific time or a second application local to the handset for example. Moreover the second application must be started by the handset user.

A Mobile network operator may need to administrate a midlet which is installed on a handset on the field. According to prior art, such administrative operations may be carried out only if the midlet is active on the handset. There is a need for allowing a mobile network operator to remotely administrate a midlet through a SIM smart card and without any user actions.

SUMMARY OF THE INVENTION

An object of the invention is to solve the above mentioned technical problem.

The object of the present invention is a method for managing an application which is embedded in a telecom device. The telecom device comprises a SIM card and a Push Registry as defined by the Mobile Information Device Profile® specifications. The application is intended to be registered in the Push Registry by defining a specific inbound connection associated to the application. The SIM card requires a local connection on the specific inbound connection for activating the application and for establishing a local communication channel between the SIM card and the application.

Advantageously, the specific inbound connection may be a specific port number.

The SIM card may require the local connection on the specific inbound connection further to a request sent by a distant server.

The distant server may send its request through a telecom mobile network.

In a preferred embodiment, the application and the SIM card may be able to manage a specific protocol for exchanging data through said local communication channel. The distant server may send data to the application through said local communication channel.

In another embodiment, the application and the SIM card may be able to manage a specific protocol for exchanging data through said local communication channel. The SIM card may comprise a second application and the telecom device may comprise an input interface which allows a user to select the second application. The second application may exchange data with the application embedded in the telecom device through the local communication channel.

Advantageously, the second application may be a web application and the telecom device may comprise a web browser. The data which is retrieved from the application embedded in the telecom device may be displayed through the browser.

The data displayed through the browser may be updated by the user through the input interface and data which has been updated by the user may be sent to the application embedded in the telecom device through the local communication channel.

Alternatively, the second application may be a SIM Tool Kit application and the telecom device may comprise a third application of SIM Tool Kit type. The data which is retrieved from the application embedded in the telecom device may be displayed through the third application.

Advantageously, the telecom device may be a mobile phone or a telecom equipment.

Another object of the invention is an electronic token comprising an application controller and identity data related to a subscriber of a telecom mobile network. The electronic token is intended to be connected to a telecom device. The telecom device comprises an application and a Push Registry as defined by the Mobile Information Device Profile® specifications. The application is intended to be registered in the Push Registry by defining a specific inbound connection associated to the application. The electronic token comprises a first means capable of requiring a local connection on said specific inbound connection for activating the application and for establishing a local communication channel between the electronic token and the application.

Advantageously, the electronic token may comprise a second means capable of managing a specific protocol for exchanging data with said application through the local communication channel.

The specific inbound connection may be a specific port number.

Another object of the invention is a telecom device comprising an electronic token, an application and a Push Registry as defined by the Mobile Information Device Profile® specifications. The application is intended to be registered in the Push Registry by defining a specific inbound connection associated to the application. The electronic token is the electronic token of the above-described type.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which:

FIG. 4 is an example of protocol and commands which may be used between an electronic token and a midlet according to the invention; and FIG. 5 is an example of exchanged frames for a "Get version" command through a specific protocol between a connected electronic token and a midlet according to the invention.

DETAILED DESCRIPTION OF THE PREFERRED EMBODIMENTS

The invention may apply to any types of electronic token comprising SIM features and intended to be connected to telecom equipments.

The present invention relies on the fact that the electronic token acts as an administrative proxy allowing to send data to an inactive application of a telecom device. The application of the telecom device is started on the electronic token initiative. The electronic token is also able to send data to an active application of a telecom device.

An advantage of the invention is to allow a Mobile Network Operator MNO to automatically push data in a midlet embedded in telecom equipments which are on the field.

Another advantage of the invention is to provide a solution for using a midlet even when the midlet is not active.

Another advantage of the invention is to provide a solution for activating a midlet without any action of the user of the telecom device.

Another advantage of the invention is to provide a solution which is compliant with existing telecom handsets and does not require to upgrade the deployed handsets.

Figure 1:
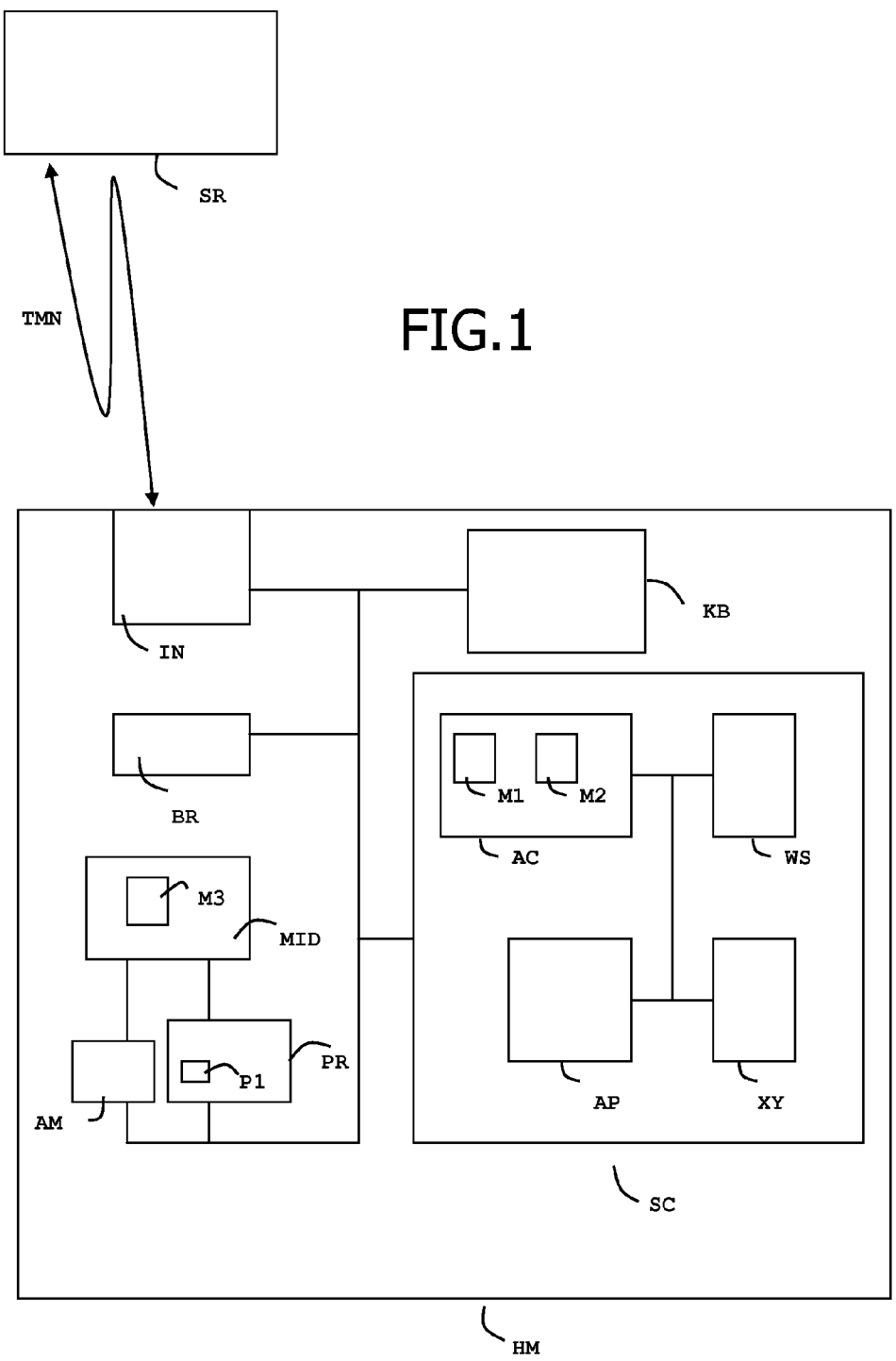
FIG. 1 depicts schematically an example of architecture of a telecom device HM and a connected electronic token of smart card type according to the invention.

FIG. 1 shows the architecture of a telecom device HM and a connected electronic token SC of smart card type according to a preferred embodiment of the invention. In this example, the electronic token SC is a Java Card®. FIG. 1 shows a link with a distant server SR managed by a Mobile Network Operator.

The telecom device HM comprises an application MID, a Push Registry PR, an application manager AM, a browser BR, a keyboard KB and a communication interface IN allowing communication through the telecom mobile network TMN. The Push Registry PR is compliant with the Mobile Information Device Profile® 2.0 specifications. The application MID is a midlet compliant with Mobile Information Device Profile® 2.0 or upper specifications. The midlet MID is registered in the Push Registry PR thanks to a specific inbound connection P1 which is associated to the application MID. The inbound connection P1 is a dedicated socket port. The application manager AM is an application manager software (AMS) compliant with the Mobile Information Device Profile® 2.0 specifications. The application MID is intended to be run by a virtual machine embedded in the telecom device HM.

The electronic token SC comprises a working memory of RAM type, a non volatile memory, a microprocessor and a communication interface allowing exchanging data with the telecom device HM. The non volatile memory comprises an operating system, a virtual machine, an application AP, an application controller AC, a smart card web server WS and an OTA proxy XY. The OTA proxy is compliant with OMA Standard, for example OMA SCWS V1.0 dated Sep. 2, 2007. The OTA proxy allows the MNO to remotely administrate the SIM card SC. In this example, the application controller AC is implemented as a midlet controller. The application controller AC comprises two means M1 and M2. The first means M1 is capable of requiring a local connection on the specific inbound connection P1. The second means M2 is capable of managing a specific protocol SP for exchanging data with the midlet MID. The midlet MID comprises a means M3 which is capable of managing the specific protocol SP for exchanging data with the means M2.

The specific protocol SP defines the structure of data frame to be exchanged between the midlet MID and the SIM card SC.

FIG. 4 shows an example of frames which may be used by the specific protocol SP.

The specific protocol SP is based on a couple command/response where a first frame is dedicated to the command sending and a second frame is dedicated to the response sending.

The frames sent by the electronic token SC may be made of four parts: a command number, a command identifier (Command Id), a command length and a command data. This frame contains a command sent by the token SC to the midlet. In this example, the command number is set on one byte. The command number is managed as a counter which allows matching the relevant response with the sent command. The command identifier may be set on one byte and corresponds to the type of command. The command length may be set on one, two or four bytes and corresponds to the length of data in the fourth part of the frame. The fourth part of the frame is the command data part. The command data contains the applicative data of the command intended to be sent to the midlet. The command data part may be empty if no applicative data is related to the sent command. In particular, when the sent command is a "STOP" command, the command length part is equal to zero and the command data part is empty.

The frames sent by the midlet may be made of four parts: a command number, a command identifier (Command Id), a response length and a response data. This frame contains a command sent by the midlet to the electronic token SC. In this example, the command number is set on one byte. The command identifier may be set on one byte and corresponds to the type of command corresponding to the response. The command identifier is optional. For example the response length may be BER-encoded in order to differentiate a frame with a command identifier from a frame without any command identifier. The response length may be set on two or four bytes and corresponds to the length of data in the fourth part of the frame. The fourth part of the frame is the response data part. The response data contains the applicative data to be sent in response to a received command. The response data may be empty. For example the response data part corresponding to a "Set Config" command is empty. The command number may be useful to distinguish the relevant response when several commands sharing the same type are sent by the token SC.

Advantageously, the specific protocol SP may define a command set. For example the following commands may be used. The "Stop" command may be defined with a Command identifier equal to 0×00. The "Stop" command allows stopping the midlet. The "Get Version" command may be defined with a Command identifier equal to 0×01. The "Get Version" command allows retrieving the current version of the midlet. The "Get configuration" command may be defined with a Command identifier equal to 0×02. The "Get configuration" command allows retrieving the current configuration of the midlet. The current configuration may be made of a list of midlet parameters. The "Set configuration" command may be defined with a Command identifier equal to 0×03. The "Set configuration" command allows updating the current configuration of the midlet by providing new parameter values. The "Status" command may be defined with a Command identifier equal to 0×04. The "Status" command allows retrieving the current status of the midlet. In particular, the current status may be "OK" or "Not OK". The current status may also be "launched by user" or "connection is alive".

FIG. 5 shows an example of exchanged frames through the specific protocol SP for a "Get Version" command according to the invention.

In this example, the "Get Version" command is comprised in a frame made of three bytes: 0×01, 0×01 and 0×00. The first byte is the command number. The value 0×01 indicates that this is the first command in the current session. The second byte is the command type. The value 0×01 indicates that the command is the "Get Version" command. The third byte is the command length. The value 0×00 indicates that no command data is sent on the fourth part of the frame.

The Get Version response is comprised in a frame made of six bytes: 0×01, 0×01, 0×03, "1", "." and "4". The first byte is the command number. The value 0×01 indicates that the response frame corresponds to the previously sent command which has a command number equal to 0×01. The second byte is the command type. The value 0×01 indicates that the response corresponds to a "Get Version" command. The third byte is the command length. The value 0×03 indicates that the fourth part comprises three bytes. The response data comprises "1", "." and "4" which means the current version of the midlet is V1.4.

Advantageously, additional commands may be defined for enhanced services. For example a What Configuration command may be defined allowing a token SC to ask a midlet for mandatory parameters which are required for a basic configuration.

Figure 2:
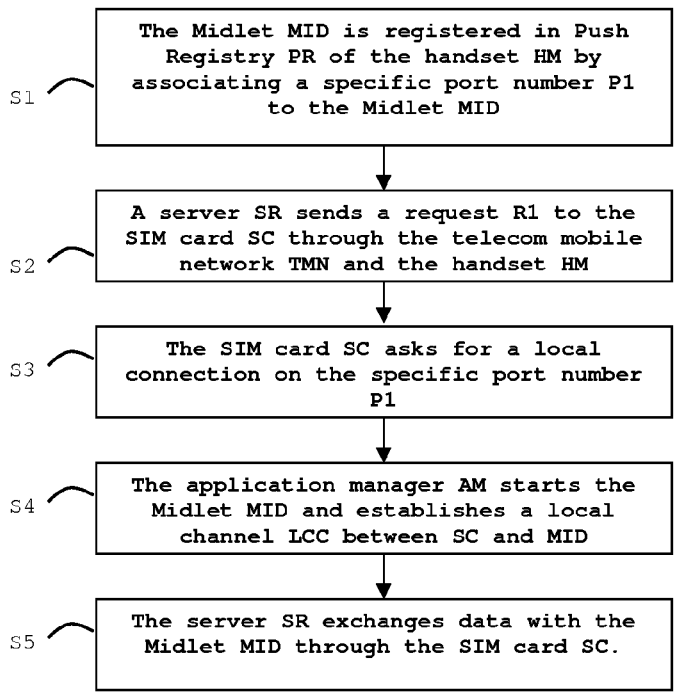
FIG. 2 is an example of step sequence for starting and administrating a midlet according to the invention.

FIG. 2 shows an example of a step sequence for activating a midlet MID embedded in a telecom device HM and exchanging data between a MNO server SR and the midlet MID.

In this example, the specific inbound connection corresponds to an open channel required on the specific port number P1. The midlet MID is supposed to be installed on the telecom handset HM. For instance, the application MID installation is run by using a .JAD file which comprises first and second data. First data is intended to be used for initializing the Push Registry PR. Second data is intended to be sent to the SIM card SC in order to notify the SIM card of the midlet installation. In particular, the second data may contain a reference of the port associated to the midlet MID and an identifier of the midlet MID. The second data may be sent to the smart card web server WS of the SIM SC. Then the second data may be stored in the SIM SC so that the means M1 is able to retrieve the second data when needed.

First the midlet MID is registered in the Push Registry PR of the telecom handset HM at step S1. In a preferred embodiment, the midlet registration is done at installation time. This operation corresponds to a static registration.

Alternatively the midlet registration may be done by the midlet itself. The midlet registration may be done when the midlet MID is first activated manually or at any time during the lifecycle of the midlet. For example, the midlet registration may be performed on receipt of a network event or when an event which is local to the mobile phone happens. This operation corresponds to a dynamic registration.

Similarly the stop of the midlet registration may be done by the midlet itself.

The midlet registration is carried out by storing a specific port number P1 in the Push Registry PR. The specific port number P1 is associated to the midlet MID in the Push Registry PR.

Alternatively, the installation of the application MID may be run without using a .JAD file. In similar situation, the application MID may contain all pieces of information allowing it to register itself in the Push Registry PR. The application MID may send the notification to the electronic token SC. In other words the midlet MID may directly inform the SIM card SC of the notification without using the services of the application manager AM.

At step S2, the server SR sends a first request R1 to the SIM card SC. The request R1 is sent through the telecom mobile network TMN and received by the handset HM. In a preferred embodiment, the request R1 is sent through the Over The Air mechanism as defined by ETSI SCP 102.225 and ETSI-SCP 102.226 standards. Then the handset HM provides the SIM card SC with the request R1. The request R1 comprises an identifier corresponding to the targeted midlet MID. Advantageously, the application manager AM or the smart card web server WS is able to retrieve the relevant specific port number P1 from the targeted midlet MID identifier. Alternatively, the request R1 may comprise an identifier corresponding to the specific port number P1.

At step S3, the means M1 of the SIM card SC requires a local connection on the specific port number P1. The means M1 sends an "Open channel" command to a local address on the specific port number. The "Open channel" command is addressed to the network layer of the mobile phone HM. The "Open channel" command is a proactive command which is defined by the ETSI TS 102 223 standards. In a preferred embodiment, the "Open channel" command is set in Packet data mode as defined by ETSI TS 102 223 standard.

Alternatively, the "Open channel" command may be set in Terminal server mode as defined by ETSI TS 102 223 standard.

The BIP client SIM Tool Kit commands defined in the TS 102.223 may be used. A BIP client is usually used to administrate the SIM card. In such a case, the connection used to be established between a SIM card and a server. In order to control the midlet MID, the BIP client connection is connecting to a local host address on the specific port P1 instead of connecting to a remote server IP address. For instance, if the midlet has been registered on the specific port P1 equal to 6000, the client connection may be opened to the local address "http://127.0.0.1:6000".

At step S4, the application manager AM detects that a connection is requested for an inbound connection registered in the Push registry PR. Then the application manager AM starts the midlet MID associated to P1 in the Push registry PR. Since the connection is established with the midlet MID, a local channel LCC is now active between the SIM card and the midlet MID. The midlet MID is working in slave mode.

At step S5, the server SR sends a command to the SIM card SC. The command contains data intended to be used by the application MID. The data is sent by the SIM card SC to the midlet MID through the active local communication channel LCC. For example, the data received by the midlet MID may be related to a new configuration of the midlet M1 or to a new branding associated to the midlet MID. The received data may also be an advertising banner to be associated to the midlet MID.

The midlet MID may also send data to the server SR in response to the command. Thus the distant server SR may get data provided by the midlet MID.

The mobile network operator is the issuer of the SIM card and fully controls the SIM card content and behavior. Through the SIM card SC, the mobile network operator is able to control a midlet stored in a telecom device HM. In particular, the mobile network operator may lock a sensitive midlet if the handset has been stolen. The mobile network operator may request a midlet to open a connection to a server to get the latest version of an application or any other data. Thus the midlet does not have to remain active. The midlet does not have to continuously poll a distant server for looking for upgrade data.

Alternatively, the active local channel LCC may remain unused after the starting of the midlet MID. In this case, the application MID has just been started. Thus the invention may provide an application launcher which can be triggered by the SIM card or by a remote server SR of a MNO. This may be useful for starting an application on the handset equipment HM from a remote machine SR.

Alternatively, the request R1 may be sent through another wireless or contact channel. For example, data may be exchanged between the SIM card and the MNO server according to a Wi-fi®, Bluetooth® or NFC® (Near Field Communication) link. The SIM card and the MNO server may exchange data via a router connected to Internet. The data may be directly exchanged between the SIM card and the MNO server or may be exchanged through the telecom device HM.

Figure 3:
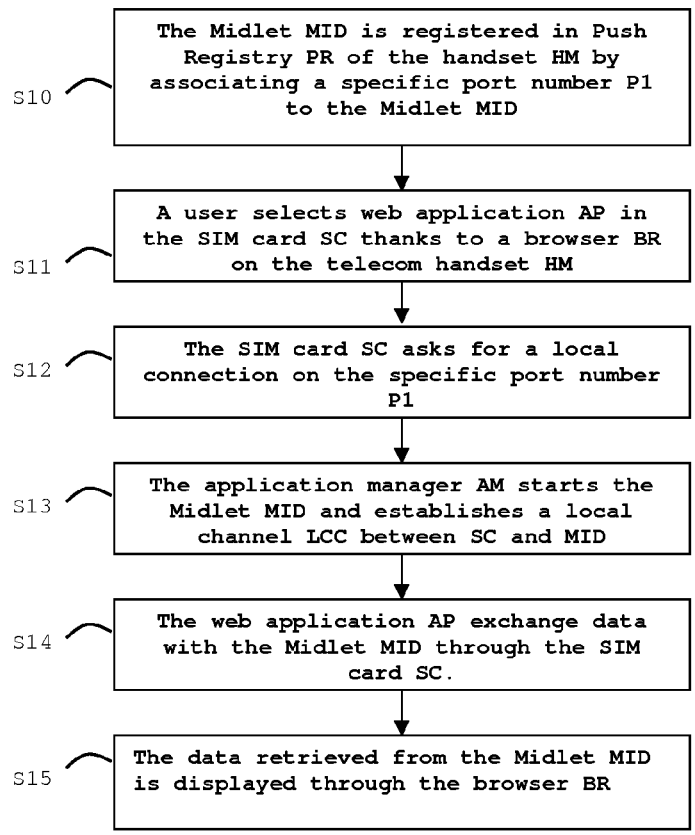
FIG. 3 is another example of step sequence for starting and administrating a midlet according to the invention.

FIG. 3 shows an example of a step sequence for activating a midlet MID embedded in a telecom device HM and exchanging data between the handset user and the midlet MID. In the example of FIG. 3, the SIM cards SC is asked to activate the midlet MID by a user input.

First the midlet MID is registered in the Push Registry PR of the telecom equipment HM at step S10. The midlet registration is carried out by storing a specific port number P1 in the Push Registry PR. The couple made of P1 and the associated midlet MID is recorded in the Push Registry PR.

At step S11, a user selects a web application AP which is embedded in the SIM card SC. The web application AP is accessed by the user through the browser BR of the telecom equipment HM. In a preferred embodiment the application AP is designed to be able to manage the midlet MID. The application AP comprises an identifier corresponding to the specific port number P1.

Alternatively, the SIM card launches a browser STK command in order to open the handset browser BR to a local URL "http://127.0.0.1:6000". The midlet MID is supposed to have been registered on the port 6000 in the Push Registry PR.

At step S12, the means M1 of the SIM card SC requires a local connection on the specific port number P1. The local connection is requested through an "Open channel" command.

At step S13, the application manager AM detects that a connection is requested for an inbound connection registered in the Push registry PR. Then the application manager AM starts the midlet MID associated to P1 in the Push registry PR. A local channel LCC is now active between the SIM card and the midlet MID.

At step S14, the application AP may exchange data with the midlet MID through the local channel LCC. In particular, the data related to the midlet MID settings may be provided to the midlet MID. Thus the SIM card may act as a remote interface for controlling the midlet. For example, the SIM card SC may provide a web page which is an interface allowing the user to update a parameter of the application MID. In particular, the web interface may allow to change the colors used for the application MID, to load a picture or to define a connecting URL for the application MID.

At step S15, the application AP may display data retrieved from the midlet MID through the browser BR.

Thus a panel setting may be managed for the midlet MID through the browser of the telecom device HM. An advantage of the invention is to avoid the development of a graphical panel setting in the midlet itself. Thanks to the invention, it is possible to manage a midlet without developing a specific configuration panel dedicated to the midlet. The invention avoids freezing parameter data in the code of the midlet itself. Thus, an advantage of the invention is to allow an easy change of the midlet MID parameters even if the MNO changed.

Another advantage of the invention is to provide an application interface which is portable and independent of mobile phone type. In particular the invention allows presenting a set of applications to be managed on an handset equipment and offering actions such as installation, launch or management of the application set.

The midlet MID registers a message type in the Push registry PR whose occurrence triggers the starting of the midlet. In a preferred embodiment the message type corresponds to socket activation. Alternatively, the message type may correspond to a SMS or a datagram.

The electronic token SC may control the midlet stored in the telecom device HM. In particular, the electronic token SC may start, stop, lock, and unlock a midlet.

Alternatively, the SIM cards SC may be asked to activate the midlet MID by any preset event. For example the SIM card may start the midlet MID on a timer event, on any SIM Tool kit event, or on a triggering initiated by another card application or handset application. In particular the SIM card may be triggered at each handset startup or every day.

Advantageously, the electronic token SC may deactivate the midlet MID and close the local communication channel LCC.

The invention may be used for a plurality of applications embedded in a telecom terminal.

The invention may be used with an electronic token welded to a telecom equipment.

In the above-described examples the SIM card SC comprises a smart card web server WS. Alternatively, a SIM Tool Kit application embedded in the SIM card may take the place of the smart card web server WS and the telecom device HM may comprise a third application of SIM Tool Kit type. In such a situation data retrieved from the midlet MID is displayed on the telecom device HM thanks to the display features of the third application.

The invention claimed is:

1. A method for managing an application embedded in a telecom device, said telecom device comprising a SIM card and a Push Registry as defined by the Mobile Information Device Profile specifications, said application being intended to be registered in the Push Registry by defining a specific inbound connection associated with the application, the SIM card being configured to require a local connection on the specific inbound connection for (i) activating the application embedded in the telecom device and (ii) for establishing a local communication channel between the SIM card and the application, wherein the SIM card requires the local connection on the specific inbound connection by using data which comprise a reference of the specific inbound connection and an identifier of the application, and wherein said method comprises the steps of:

notifying the SIM card of installation of the application in said telecom device by sending, to the SIM card, said data comprising said reference of the specific inbound connection and said identifier of the application;

storing said data in the SIM card; and exchanging data with said application via said SIM card.

2. A method according to claim 1, wherein the specific inbound connection is a specific port number.

3. A method according to claim 1, wherein the SIM card requires the local connection on the specific inbound connection in response to the receipt of a request sent by a distant server.

4. A method according to claim 3, wherein the distant server sends said request through a telecom mobile network.

5. A method according to claim 3, wherein the application and the SIM card are configured to manage a specific protocol for exchanging data through said local communication channel, and wherein the distant server sends data to the application through said local communication channel.

6. A method according to claim 1, wherein the application and the SIM card are configured to manage a specific protocol for exchanging data through said local communication channel, wherein said SIM card comprises a second application, wherein said telecom device comprises an input interface allowing a user to select said second application, and wherein said second application exchanges data with the application embedded in the telecom device through said local communication channel.

7. A method according to claim 6, wherein said second application is a web application, wherein said telecom device comprises a web browser and wherein data which is retrieved from the application embedded in the telecom device is displayed through the browser.

8. A method according to claim 7, wherein the data displayed through the browser is updated by the user through said input interface and data which has been updated by the user is sent to the application through the local communication channel.

9. A method according to claim 6, wherein said second application is a SIM Tool Kit application, wherein said telecom device comprises a third application of SIM Tool Kit type and wherein data which is retrieved from the application embedded in the telecom device is displayed through the third application.

10. A method according to claim 1, wherein said telecom device is a mobile phone or a telecom equipment.

11. An electronic token comprising an application controller and identity data related to a subscriber of a telecom mobile network and configured to connect to a telecom device, said telecom device including a Push Registry and an application installed therein, wherein said installed application is to be registered in the Push Registry by defining a specific inbound connection associated with the application, said electronic token further comprising:

a first means requiring a local connection on said specific inbound connection for activating the application installed in said telecom device and for establishing a local communication channel between the electronic token and the application, wherein the first means of said electronic token uses data including a reference of the specific inbound connection and an identifier of the application, and said electronic token is configured to (i) store said data and (ii) interpret the receipt of said data as a notification of the application availability.

12. An electronic token according to claim 11, wherein the electronic token comprises a second means able to manage a specific protocol for exchanging data with said application through said local communication channel.

13. A method according to claim 11, wherein the specific inbound connection is a specific port number.

14. An electronic token according to claim 11, wherein said electronic token is a SIM card.

15. A telecom device comprising an electronic token, an application and a Push Registry, said application being intended to be registered in the Push Registry by defining a specific inbound connection associated with the application, wherein said electronic token is the electronic token of claim 11.

* * * * *